J. E. JENNINGS.
APPARATUS FOR TESTING COLOR SENSE.
APPLICATION FILED JULY 22, 1914.
1,118,014.  Patented Nov. 24, 1914.
2 SHEETS—SHEET 1.
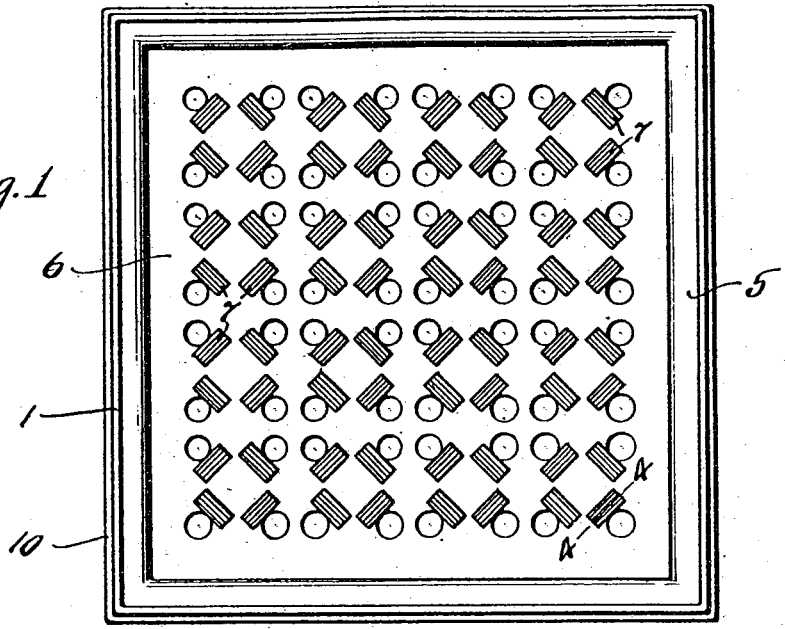
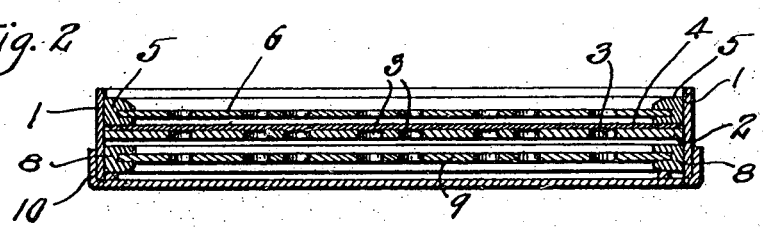
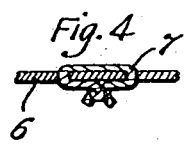
Witnesses  Inventor:
J. E. Jennings,
By ... Atty.

J. E. JENNINGS.
APPARATUS FOR TESTING COLOR SENSE.
APPLICATION FILED JULY 22, 1914.
1,118,014.
Patented Nov. 24, 1914.
2 SHEETS—SHEET 2.
Fig. 5
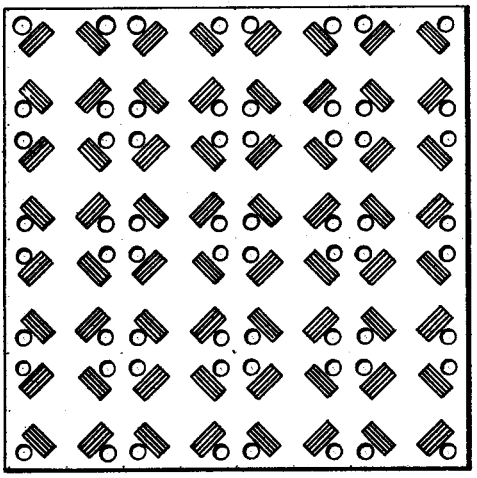
Green Test
Fig. 6
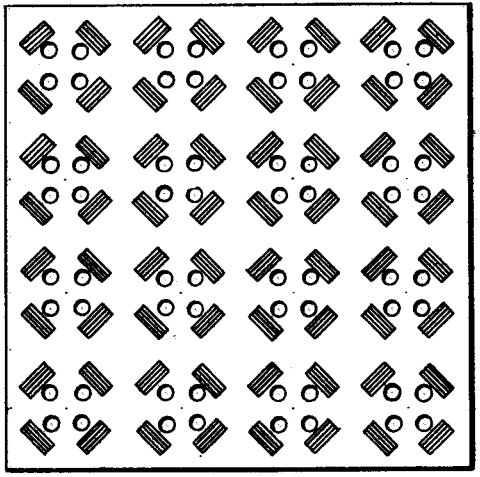
Rose Test
Fig. 7
| RECORD of COLOR SENSE. | | | | | | |
|---|---|---|---|---|---|---|
| NAME _____ EMPLOYMENT _____ STATION _____ | | | | | | |
| GREEN | | | | | | |
| ROSE | | | | | | |
| ROSE | | | | | | |
| GREEN | | | | | | |
| GREEN | | | | | | |
| ROSE | | | | | | |
| ROSE | | | | | | |
| GREEN | | | | | | |
| GREEN | | | | | | |
| ROSE | | | | | | |
| ROSE | | | | | | |
| GREEN | | | | | | |
| GREEN | | | | | | |
| ROSE | | | | | | |
| ROSE | | | | | | |
| GREEN | | | | | | |
| DATE _____ EXAMINER _____ | | | | | | |
Record Sheet
Witnesses
Wm. Janus
Laura Meyer
Inventor:
J. E. Jennings,
By J. R. Cornwall,
Atty.

UNITED STATES PATENT OFFICE.

JOHN ELLIS JENNINGS, OF ST. LOUIS, MISSOURI.

APPARATUS FOR TESTING COLOR SENSE.

1,118,014.      Specification of Letters Patent.      Patented Nov. 24, 1914.

Application filed July 22, 1914. Serial No. 852,460.

*To all whom it may concern:*

Be it known that I, JOHN ELLIS JENNINGS, a citizen of the United States, residing at St. Louis, Missouri, have invented a certain new and useful Improvement in Apparatus for Testing Color Sense, of which the following is a full, clear, and exact description, such as will enable others skilled in the art to which it appertains to make and use the same, reference being had to the accompanying drawings, forming part of this specification, in which—

Figure 1 is a plan view of my apparatus. Fig. 2 is a vertical cross sectional view through the same. Fig. 3 is a plan view of the test record. Fig. 4 is a sectional view on line 4—4 of Fig. 1. Figs. 5 and 6 are plan views of the color boards in the green and rose tests respectively whereby it is possible to make a record of the tests from both boards on the same sheet of paper. Fig. 7 is a record sheet for receiving the records of the tests made from the color boards shown in Figs. 5 and 6.

For many years the Holmgren colored worsteds have been used by the railways and marine service of the United States and most foreign countries to test the color-sense of their employees. When properly made, according to directions, this test has proved to be practicable and reliable. The most serious objections to it are: 1. The worsteds become soiled by constant handling so that the more delicate shades can hardly be distinguished one from the other. 2. The method of recording the skeins selected by the candidate is crude, laborious and liable to lead to error. In order to overcome these objections, I have constructed a test in which the worsteds are not handled and the candidate makes a permanent record of his own color-sense.

One form of my invention consists of a square box divided into an upper and lower half, each half having a lid, virtually two shallow boxes with bottoms joined together. The upper side of the box is marked "Test No. I green" and contains a color board made up of all the different colors, shades and tints likely to be mistaken by the color blind for green. The lower side of the box is marked "Test No. II rose", and contains a color board made up of all the different colors likely to be mistaken by the color blind for rose. The color boards, like the box, are absolutely square and each contains any number (64 are shown) patches of worsteds (¼x½ inch in size has been found desirable in practice) of various colors and shades. In the form shown, this makes a total of one-hundred-and-twenty-eight (128) colors used in the test.

In close proximity to each patch of colored worsted is a circular opening in the color board which is for the purpose of registering the particular patch of color chosen by the candidate. This he does by inserting a pointed pencil of wood or metal through the opening and punching a hole in the record sheet which had previously been placed beneath the color board. The position of the patches of color and the circular openings have been arranged in an absolutely symmetrical design, so that when the box is turned in any one of four positions the same appearance is presented and it is impossible to say which is top or which is bottom.

*Method of making the test.*—The cover is removed, the color board lifted out, a record blank inserted and the color board replaced. Care must be taken to see that the mark "Top" in the box, "Top" on the back of the color board, and the top of the record blank all correspond. The box is now turned around several times until all sense of direction is lost. The green test skeins, preferably fastened to the inside of the box cover, is placed at a distance of two feet and the candidate is given the pointed pencil and requested to look along each row of colored patches and when he sees the test color, or one of its lighter or darker shades, he is to place the point of the pencil in the opening opposite and punch a hole in the paper beneath. Having completed test No. I, the cover is replaced and the box turned over, exposing test No. II, the rose. The record blank having been inserted and the rose skein displayed, the test proceeds as before.

*Advantages.*—Among the advantages of the above construction may be mentioned the following: The candidate makes a permanent record of his own color sense; the soiling of the worsteds by constant handling is avoided; the worsteds are divided into two groups; in the first group are placed all the colors mistaken for green by the color blind: in the second group are placed all the colors mistaken for rose by the color blind; the comparison of colors by placing two or more together is avoided; the larger number of colors used gives free scope in the detection of all cases of color-blindness; the small size of the color patches, while ample to show the color to the normal eyed, may lead to the detection of a central color scotoma; the tedious method of recording the color sense by pulling out a concealed bangle, and writing its number on a blank is avoided; an important color is not liable to be lost; on account of its symmetry it is absolutely impossible for any but those with a perfect color sense to pass the test; the examination may be made by the physician or layman; and two or more records of the examination can be made at the same time and the official at headquarters, by placing the record in his color box, is able to see exactly what colors have been selected to match the test skeins.

In the drawings 1 indicates the walls of a rectangular box having a partition wall 2 located about its middle. The partition wall is perforated with a series of openings 3 in registration with the openings of the color board.

4 is the record sheet, shown in Fig. 3, which is preferably divided in spaces by suitable lines and which is placed on the partition wall 2 preparatory to making the test.

5 is a frame, preferably of a size to fit within the wall 1, said frame carrying a color board 6 perforated as shown in Fig. 1 and adjacent to which perforations are the test colors, either printed thereon, or in the form of strands of worsted 7, Fig. 4, whereby the candidate may compare the match color in the form of a skein of worsted (not shown). In the under compartment of the box is another frame 8 containing a series of colors, or shades of colors, for the test of the second, or rose color. This frame 8, which carries a color board 9, is provided with a series of perforations, adjacent to which are colors printed, or in the form of strands of worsted, as before mentioned, of a color and shade to test the candidate relative to his color sense with respect to the rose color. There is a cover 10 for the box shown in Fig. 2 as being located on the bottom thereof and it is intended that a similar cover shall be provided for the top of the box to protect the colors on the color board for the first test, when the same is inverted for the second test, or placed away in readiness for another test.

In Fig. 5 I have shown, diagrammatically, a modified form of color board for the green test, and in Fig. 6, a modified form of color board for the rose test, in which it will be observed that the arrangement of colors and shades is substantially the same on both boards, but the openings adjacent the colors are relatively displaced, that is, they do not register when the boards are superposed upon the record sheet shown in Fig. 7. This enables me to use a single record sheet for both the green and rose color tests, the record sheet being divided into spaces which are designed to register with the displaced openings of the two color boards respectively.

While I have shown my invention as being exemplified in one form, it is obvious that the same could be utilized in a number of different forms, such for instance, as an arrangement of the color boards of circular form; an arrangement of the color boards over a cylindrical form; an arrangement of the color boards in the same horizontal plane whereby the applicant would be called upon to select the colors of one test while the other was hidden, or the applicant might be called upon to select the colors of both tests while both were exposed.

I have not provided any means for adopting what is known as the "red" or tertiary test, but it is apparent that a third, or a number of tests, could be conducted in the manner contemplated here. I do not therefore wish to be understood as confining my invention to the form shown in the accompanying drawings, but

What I claim is:

1. An apparatus for testing the color sense which consists in the arrangement of a series of colors, or shades of colors, on a color board or sheet, said color board or sheet having an opening adjacent each color or shade of color, and a record sheet under such color board whereon an indication may be made of the selected color.

2. An apparatus for testing the color sense which consists of a plurality of color boards each having an opening adjacent the color or shade of color constituting the test, and a record sheet designed to be arranged under the color board, said record sheet being divided in spaces corresponding to the different colors or shades of color whereby an indication may be made on said record sheet through the openings in the color board to represent the colors selected by the person under test.

In testimony whereof I hereunto affix my signature in the presence of two witnesses, this 20th day of July, 1914.

JOHN ELLIS JENNINGS.

Witnesses:
F. R. CORNWALL,
M. A. HANDEL.